United States Patent
Andersen

(10) Patent No.: US 9,731,423 B2
(45) Date of Patent: Aug. 15, 2017

(54) FLOW BLOCKING VALVE, A VACUUM LIFTING DEVICE AND A METHOD FOR OPERATING A VACUUM LIFTING DEVICE

(71) Applicant: INVA INVEST HOLDING ApS, Randers SØ (DK)

(72) Inventor: Finn Lynge Dahl Andersen, Randers SØ (DK)

(73) Assignee: INVA INVEST HOLDING ApS, Klarup (DK)

( * ) Notice: Subject to any disclaimer, the term of this patent is extended or adjusted under 35 U.S.C. 154(b) by 44 days.

(21) Appl. No.: 14/782,075

(22) PCT Filed: Mar. 24, 2014

(86) PCT No.: PCT/DK2014/050071
§ 371 (c)(1),
(2) Date: Oct. 2, 2015

(87) PCT Pub. No.: WO2014/161549
PCT Pub. Date: Oct. 9, 2014

(65) Prior Publication Data
US 2016/0059425 A1 Mar. 3, 2016

(30) Foreign Application Priority Data
Apr. 2, 2013 (DK) .......................... PA 2013 70181

(51) Int. Cl.
*B25J 15/06* (2006.01)
*B65G 47/91* (2006.01)
(Continued)

(52) U.S. Cl.
CPC ....... *B25J 15/0625* (2013.01); *B25J 15/0616* (2013.01); *B65G 47/91* (2013.01); *F16K 1/14* (2013.01); *F16K 31/12* (2013.01)

(58) Field of Classification Search
CPC B25J 15/0625; B25J 15/0616; B25J 15/0052; B65G 47/91; F16K 1/14; F16K 31/12
(Continued)

(56) References Cited

U.S. PATENT DOCUMENTS 2,998,256 A 2/1958 Lipkins
3,556,579 A 1/1971 Seymore-Walker
(Continued)

FOREIGN PATENT DOCUMENTS

DE 19817777 C1 9/1999
DE 102008008465 A1 2/2009
(Continued)

OTHER PUBLICATIONS

International Search Report for corresponding application PCT/DK2014/050071 filed Mar. 24, 2014; Mail date Sep. 12, 2014.

*Primary Examiner* — Gabriela Puig
(74) *Attorney, Agent, or Firm* — Cantor Colburn LLP

(57) ABSTRACT

Disclosed is a flow blocking valve, a vacuum lifting device have such valve, a vacuum lifting arrangements, and methods for operating the same, the valve including a valve housing part forming a flow duct between a flow inlet arranged at an inlet end of the duct and a flow outlet arranged at an outlet end of the duct, where a seat is arranged at the flow outlet, the valve further including a displaceable valve blocking device arranged to move inside the flow duct, where said blocking device is arranged to block the flow through said valve when being forced against said seat, the valve also including obstruction means being displaceable in a direction substantially transverse in relation to a longitudinal direction of the flow duct, where the obstruction means is arranged to controllably obstruct the passage of the displaceable valve blocking device without completely disabling flow through the flow duct.

13 Claims, 8 Drawing Sheets

(51) Int. Cl.
*F16K 1/14* (2006.01)
*F16K 31/12* (2006.01)

(58) Field of Classification Search
USPC .................. 294/188, 65; 901/40; 414/627
See application file for complete search history.

(56) References Cited

U.S. PATENT DOCUMENTS

| | | | |
|---|---|---|---|
| 5,241,988 A * | 9/1993 | Haynes | B67D 1/0042 |
| | | | 137/595 |
| 6,039,529 A * | 3/2000 | Persson | B65G 47/91 |
| | | | 294/188 |
| 6,517,050 B1 | 2/2003 | Pabst | |
| 8,684,434 B2 * | 4/2014 | Lomerson | B25J 15/0633 |
| | | | 294/186 |
| 2006/0208214 A1 * | 9/2006 | Okada | F16K 1/14 |
| | | | 251/368 |
| 2011/0115243 A1 | 5/2011 | Desai et al. | |
| 2016/0214812 A1 * | 7/2016 | Johnson | B65H 3/0816 |

FOREIGN PATENT DOCUMENTS

| | | |
|---|---|---|
| EP | 0351571 A2 | 1/1990 |
| FR | 2928855 A1 | 9/2009 |
| JP | 2004203532 A | 7/2004 |
| WO | 9011244 A1 | 10/1990 |
| WO | 2008019691 A1 | 2/2008 |

* cited by examiner

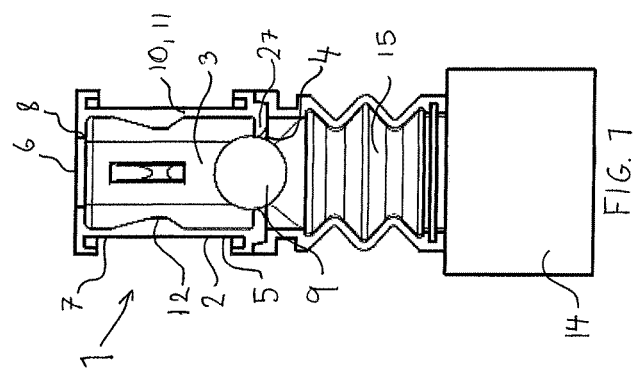
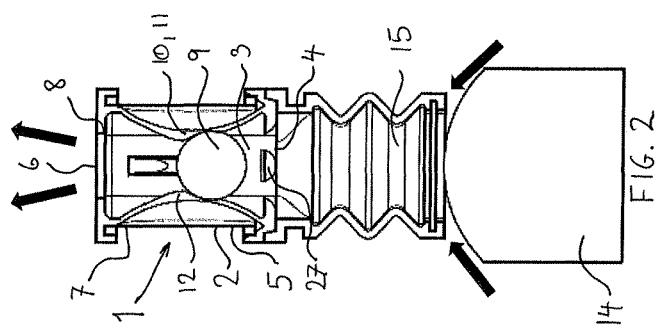
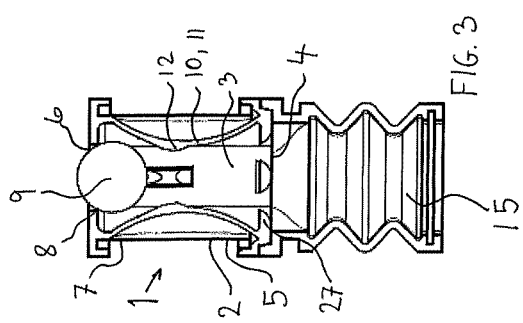

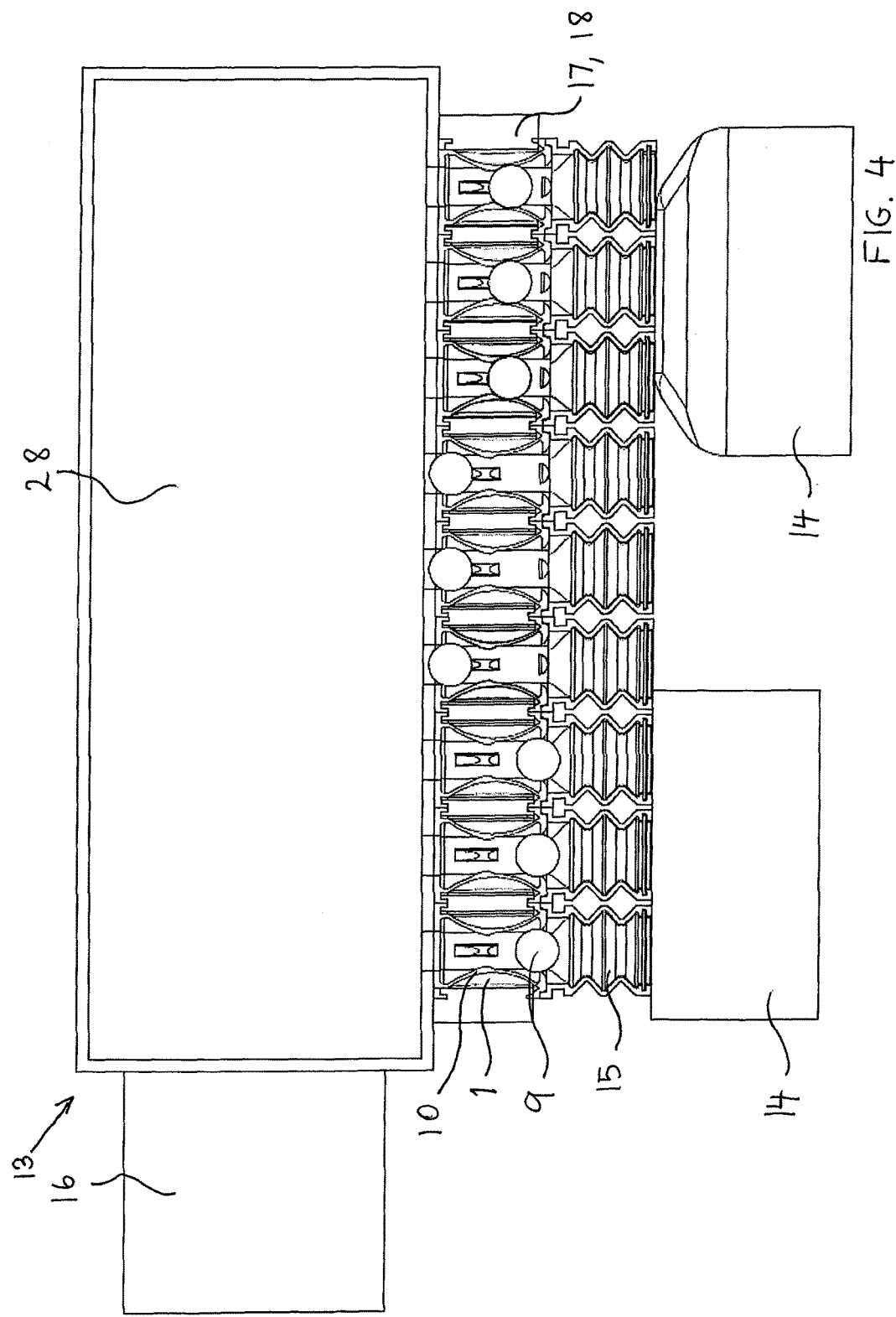

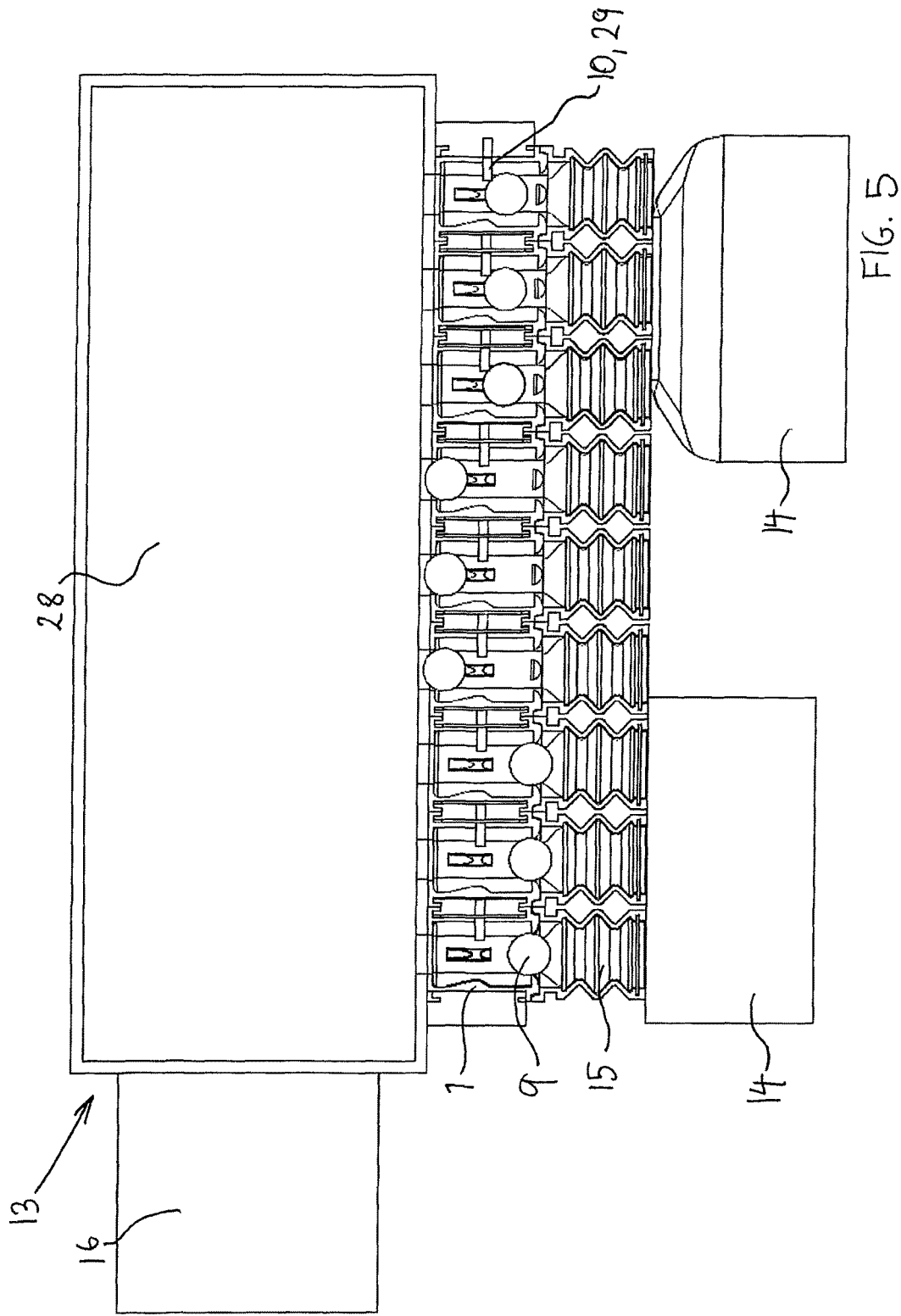

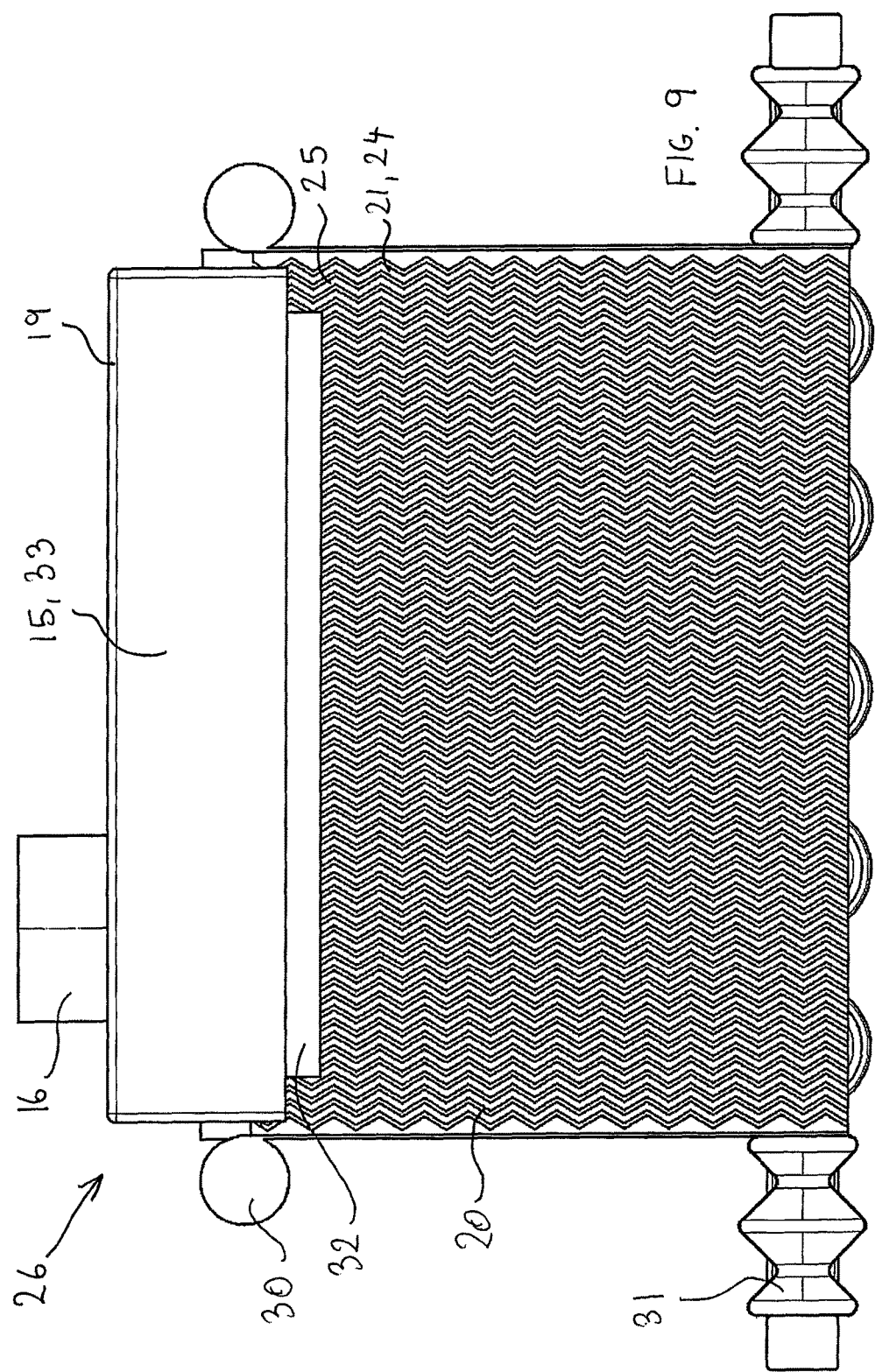

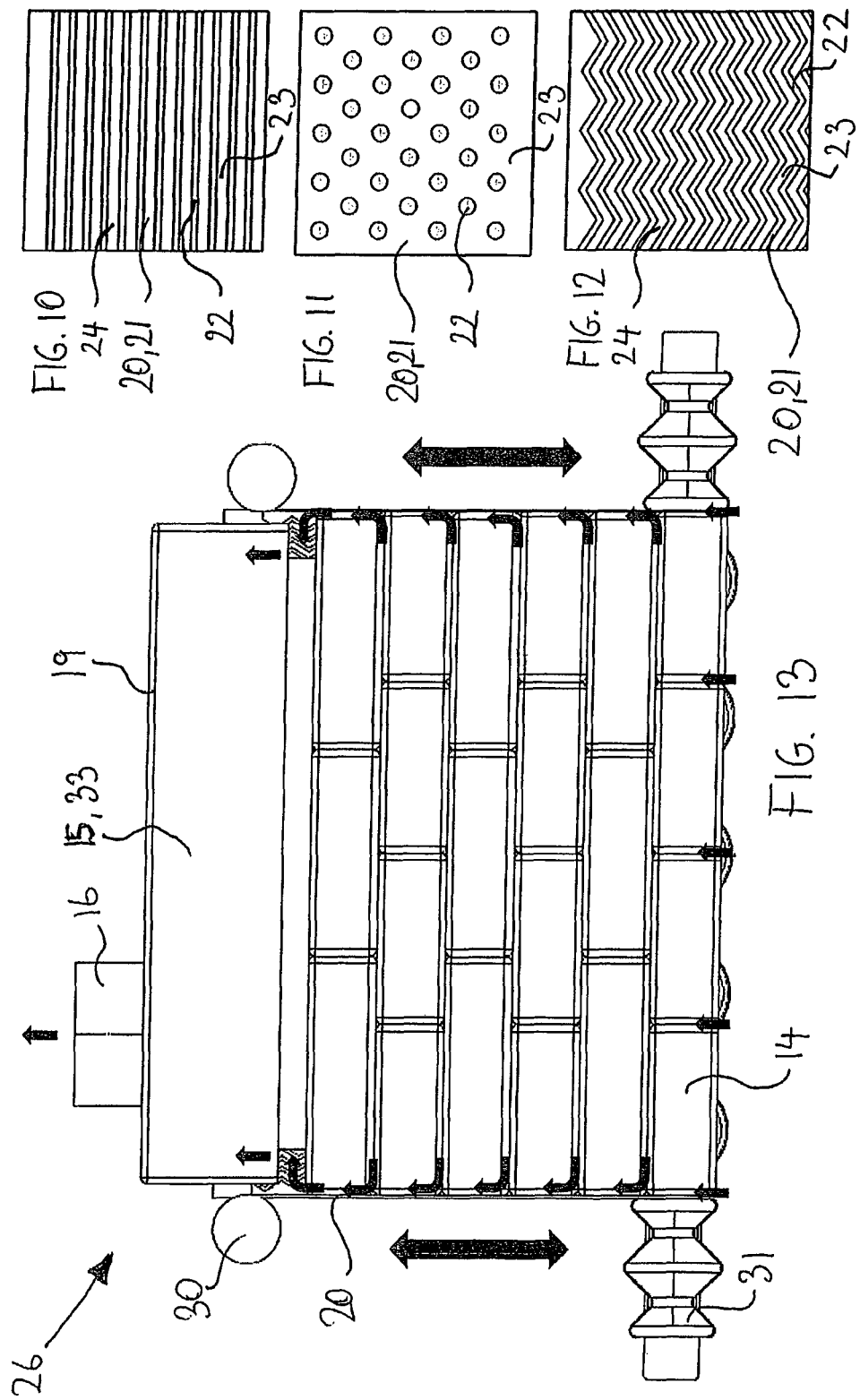

FLOW BLOCKING VALVE, A VACUUM LIFTING DEVICE AND A METHOD FOR OPERATING A VACUUM LIFTING DEVICE

FIELD OF THE INVENTION

The invention relates to a flow blocking valve comprising a valve housing part forming a flow duct, a displaceable valve blocking device arranged to move inside the flow duct and obstruction means arranged to controllably obstruct the passage of the displaceable valve blocking device without completely disabling flow through the flow duct.

The invention also relates to a vacuum lifting device for fixating goods by means of vacuum and a method for operating a vacuum lifting device.

BACKGROUND OF THE INVENTION

A vacuum lifting device is often used as a fixation tool e.g. when palletizing goods. The vacuum lifting device typically comprises an array of individual suction cups connected to a common vacuum pump so that when the lifting device is placed on an item and vacuum is established inside the suction cups, by means of the vacuum pump, the lifting device will be able to lift the item and move it around until it reaches its destination. Here the item is released by removing the vacuum inside the cups. If the item is irregularly shaped or for other reasons is difficult to handle, it is known to provide each suction cups with a flow blocking valve. A flow blocking valve ensures that that the entire lifting device does not release the load if a single (or a few) suction cups are not completely covered by the item, when the vacuum is established or if a suction cup loses its grip during lifting or displacement of the item.

A flow blocking valve usually comprises a spring loaded float inside the valve housing so that when the flow through the valve exceeds a certain level the floater is moved by the flow towards a seat and when the floater is sucked against the seat, the flow through the valve is blocked. Thus, the flow blocking valve seals the air passage from the suction cup to which it is attached, and thereby prevents a vacuum loss throughout the rest of the vacuum lifting device.

However, if the surface of the item is porous or otherwise "difficult"—i.e. it folds or changes shape when vacuum is locally applied—it is desired that the suction cups, which are not in contact with the item, are closed while the flow through the remaining cups is maintained—even if the connection between the cups and the item leaks. Thus, from WO 2008/019691 A1 it is known to provide the vacuum lifting device with arresting means comprising pins arranged to protrude down into the valve housing, coaxial with the direction of motion of the floater, inside the housing, to prevent the floater from reaching the seat and thus ensuring that the floater does not block the flow even if the vacuum pump establishes a more or less constant flow through the valve.

However, this solution is expensive, mechanically complex and unreliable.

The invention therefore seeks to provide for a simple and reliable flow blocking valve and a simple and reliable technique for lifting items by means of vacuum.

BRIEF SUMMARY

The invention provides for a flow blocking valve comprising a valve housing part forming a flow duct between a flow inlet arranged at an inlet end of the duct and a flow outlet arranged at an outlet end of the duct, wherein a seat is arranged at the flow outlet. The flow blocking valve also comprises a displaceable valve blocking device arranged to move inside the flow duct, wherein said blocking device is arranged to block the flow through said valve when being forced against said seat. The flow blocking valve further comprises obstruction means being displaceable in a direction substantially transverse in relation to a longitudinal direction of the flow duct, wherein the obstruction means is arranged to controllably obstruct the passage of the displaceable valve blocking device without completely disabling flow through the flow duct.

Forming the obstruction means so that they are displaceable in a direction substantially transverse in relation to the direction of the flow through the duct, is advantageous in that the obstruction means is moved out of the flow path when not engaged, which will increase the capacity of the valve. Furthermore, by making the obstruction means displaceable in a substantially transverse direction is advantageous in that it enables a more compact valve design in that the obstruction means can be arranged in or at the walls of the duct instead of in continuation of the valve housing.

It should be emphasized that the term "valve housing part" in this context should be interpreted as the entire valve housing, a part of the valve housing or any other part of the valve forming a duct, channel or similar suitable for housing the displaceable valve blocking device and ensuring that the displaceable valve blocking device may move between an open operational status and a blocked operational status.

In an aspect of the invention, said obstruction means is formed by a displaceable part of a wall of said duct.

Forming at least a part of the wall of the duct so that it can be displaced is advantageous in that it provides for simple and inexpensive obstruction means.

In an aspect of the invention, said displaceable part of said wall of said duct is formed at a middle part of said flow duct.

Arranging the displaceable part of the wall at a middle part of the flow duct is advantageous in that this location allows for the larges displacement of the displaceable part all things being equal.

In an aspect of the invention, said displaceable part of said wall of said duct comprise a protrusion.

By making the displaceable part of the wall comprise a protrusion is advantageous in that the risk of the displaceable valve blocking device passing the obstruction means —when these are engaged—is reduced in a simple and inexpensive manner.

In an aspect of the invention, at least said displaceable part of said wall of said duct is formed by a flexible rubber or rubber-like material.

Forming the displaceable part of the wall in a flexible material is advantageous in that it is hereby possible to displace the wall without penetrating it, thus ensuring a tighter and durable valve design. Furthermore, rubber is an inexpensive and durable material which is suited for forming a displaceable part of a valve wall.

In an aspect of the invention, said force forcing said displaceable valve blocking device against said seat is a pressure difference across said displaceable valve blocking device.

Using the pressure difference over the displaceable valve blocking device to force it against the seat of the valve is advantageous in that it is a simple and inexpensive way of forcing the displaceable valve blocking device against the seat and it also entails that the displaceable valve blocking device is only forced against the seat as long at a pressure difference is actually present. Thus, this also provides simple means for disengaging the displaceable valve blocking device from the seat and thus allow flow through the valve.

The invention also provides for a vacuum lifting device for fixating goods by means of vacuum, wherein said vacuum lifting device comprises one or more suction devices connected to a vacuum source through flow blocking valves according to any of the previously discussed flow blocking valves.

Connecting the individual suction devices to a vacuum source through individual flow blocking valves is advantageous in that a more reliable and efficient vacuum lifting device is ensured. Furthermore, the reliability and efficiency of the vacuum lifting device is increased due to the present flow blocking valve design.

In an aspect of the invention, said vacuum lifting device further comprises pressurizing means for establishing a pressure higher than atmospheric pressure at at least a part of the outside of said obstruction means of said flow blocking valves.

Establishing a pressure higher than atmospheric pressure on the outside of the valve wall will force the valve wall inwards, thus providing simple and inexpensive obstruction means operating substantially without any mechanically moving parts.

In an aspect of the invention, said pressurizing means comprises a substantially closed chamber formed at least around a part of obstruction means of said flow blocking valves.

Forming a substantially closed chamber around the obstruction means is advantageous in that enables that many valves can be operated simultaneously. Furthermore, such a common chamber provides for a simple vacuum lifting device design.

In an aspect of the invention, said pressurizing means comprises a common pressure source.

Making the pressurizing means comprises a common pressure source is advantageous in that enables that many valves can be operated simultaneously.

Furthermore, such a common pressure source provides for a simple vacuum lifting device design.

In an aspect of the invention, said one or more suction devices are one or more suction cups.

Hereby is achieved and advantageous embodiment of the invention.

In an aspect of the invention, said vacuum lifting device comprise a plurality of suction devices and a plurality of flow blocking valves.

Making the vacuum lifting device comprise a plurality of suction devices which are each connected to individual flow blocking valves is advantageous in that it hereby is easy and simple to adapt the vacuum lifting device to a given object(s) to be lifted, and it is not necessary to place the vacuum lifting device precisely the same way on the object(s) each time, which is particularly advantageous in relation with manually or semi-manually operated and propelled vacuum lifting devices.

Furthermore, the invention provides for a method for operating a vacuum lifting device comprising at least one suction device connected to at least one vacuum source through a flow blocking valve according to any of the previously described flow blocking valves. The method comprises the steps of:

placing the at least one suction device of the vacuum lifting device against an item to be moved,
activating the vacuum source,
activating obstruction means of the flow blocking valve after the vacuum source has been activated.

Activating the obstruction means immediately after activating the vacuum source is advantageous in that it is hereby possible to ensure that the displaceable valve blocking device of the flow blocking valves is caught on the desired side of the obstruction means, thus ensuring vacuum in the suction devices initially engaged even if these are not fully covered by the lifted item and even if the surface of the item changes shape as soon as it is lifted—e.g. items wrapped in loose foil which will fold during lifting. At the same time it is ensured that the displaceable valve blocking device of the suction devices, which are initially disengaged, are maintained engaged with the seat—thus blocking the valve—or at least maintained in close proximity of the seat so only the slightest flow/pressure difference will closes the valve and thereby preserve the vacuum for the initially engaged suction devices.

In an aspect of the invention, said obstruction means is activated by establishing a pressure higher than atmospheric pressure outside said obstruction means.

Using pressure to activate the obstruction means is advantageous in that mechanical parts are substantially avoided entailing a simpler and more durable vacuum lifting device design.

In an aspect of the invention, said obstruction means is activated between 1 and 5000 milliseconds, preferably between 10 and 3000 milliseconds and most preferred between 30 and 1000 milliseconds after said vacuum source is activated.

If the obstruction means is activated too soon the risk of the displaceable valve blocking device not having reached its desired position is increased and if the obstruction means is activated too late the operator will have to wait too long before lifting the goods, thus reducing the capacity of the vacuum lifting device. The present time ranges therefore provides for an advantageous relationship between function and capacity.

In an aspect of the invention, said vacuum lifting device is a vacuum lifting device according to any of the previously discussed vacuum lifting devices.

Hereby is achieved and advantageous embodiment of the invention.

Also, the invention provides for a vacuum lifting arrangement for lifting one or more items simultaneously. The vacuum lifting arrangement comprises a top frame including one or more suction devices connected to at least one vacuum source. The vacuum lifting arrangement also comprises one or more curtains extending downwards from the top frame, and displacement means for maintaining a part of the one or more curtains against the sides of one or more of the one or more items during at least a part of a lifting process, wherein an inside surface of the one or more curtains comprises an irregular surface geometry.

Providing the inside surface of the one or more curtains with an irregular surface geometry is advantageous in that the irregularities enables fluid communication between different areas of the irregular surface even when the irregular surface is forced against the one or more items, thus ensuring that the vacuum lifting arrangement will establish vacuum over a larger area of the items and thus provide a more reliable vacuum lifting arrangement with a higher capacity.

In this context the term "irregular surface geometry" should be understood as a non-even surface. I.e. the inside surface of the curtains are not flat, plan and level but does instead comprise surface irregularities which among other entails a non-uniform thickness of the curtains.

In an aspect of the invention, said irregular surface geometry comprises surface protrusions protruding between 0.1 and 20 millimeters, preferably between 0.2 and 10 millimeters and most preferred between 0.3 and 5 millimeters from a base of said irregular surface.

If the protrusions protrude too little from the inside surface the surface conduits, being formed by the protrusions—through which the vacuum can be distributed—becomes too small and the pressure rise therefore becomes too large over the active area of the curtains and the function of the protrusions is thus reduced. If the protrusions protrude too much from the inside surface, the flow required to establish the required vacuum becomes too high. Thus, the present height ranges provides for an advantageous relationship between function and capacity.

In an aspect of the invention, said surface protrusions covers an area of between 1% and 90%, preferably between 5% and 80% and most preferred between 15% and 65% of said irregular surface.

If the protrusions cover too little of the inside surface area the capacity of the lifting device becomes too small and if the protrusions cover too much of the inside surface area the capacity of the vacuum source has to be increased or the risk of the lifting device losing its grip on the load is increased, thereby increasing cost or reducing reliability. Thus, the present area ranges provides for an advantageous relationship between function and cost/reliability.

In an aspect of the invention, said surface protrusions forms a granulated surface geometry.

Forming the surface protrusions with a granulated surface geometry is advantageous in that this ensures a more even distribution of the vacuum over the entire engaged inside surface of the one or more curtains.

In an aspect of the invention, said surface protrusions forms channels each extending from a top part of said curtains and substantially down to said displacement means.

Forming the surface protrusions as downwards extending channels is advantageous in that the vacuum is hereby efficiently distributed from the suction devices in the top frame and down along the sides of the lifted items.

In an aspect of the invention, said curtains are formed primarily from a flexible rubber or rubber-like material.

Forming the curtains in a flexible rubber or rubber-like material is advantageous in that this material is inexpensive, durable and it is so flexible that it will adapt to the general surface geometry of the items to be lifted, thus ensuring a strong hold of the items during the lifting process.

In an aspect of the invention, said one or more suction devices are one or more suction cups.

Hereby is achieved and advantageous embodiment of the invention.

In an aspect of the invention, said vacuum source is a vacuum blower.

A vacuum blower produces a relatively high flow and a relatively small pressure difference which is ideal when lifting items with an awkward-shaped and/or porous surface. If a traditional vacuum pump with low flow and high pressure difference is used, the leaking suction devices will entail that the pressure difference is dramatically reduces and the risk of the vacuum lifting arrangement losing its load is severely increased.

Even further, the invention relates to the use of a vacuum lifting arrangement according to any of the previously discussed vacuum lifting arrangements for lifting awkward-shaped products.

Using a vacuum lifting arrangement according to the present invention is particularly advantageous in relation with awkward-shaped products, i.e. products such as foil-wrapped bottles or cans, boxes with a complex or irregular surface, layers of products where air gabs are formed between the products etc., because the present vacuum lifting arrangement will efficiently ensure that the supplied vacuum is primarily directed to the suction devices that are initially covered by the awkward-shaped product(s) even if the seal between the suction devices and the awkward-shaped product(s) are compromised during the lifting process.

BRIEF DESCRIPTION OF THE FIGURES

The invention will be described in the following with reference to the figures in which FIG. 1. illustrates a cross section through a flow blocking valve connected to an engaged suction device before vacuum is established, as seen from the side, FIG. 2 illustrates a cross section through the flow blocking valve and suction device during a lifting process, as seen from the side, FIG. 3 illustrates a cross section through a flow blocking valve connected to a disengaged suction device after vacuum is established, as seen from the side, FIG. 4 illustrates a cross section through a vacuum lifting device wherein the obstruction means are pressure operated, as seen from the side, FIG. 5 illustrates a cross section through a vacuum lifting device wherein the obstruction means are mechanically operated, as seen from the side, FIG. 9 illustrates a cross section through a vacuum lifting arrangement with curtains rolled down, as seen from the front, FIG. 10 illustrates a part of a curtain comprising a first embodiment of an irregular surface geometry, as seen from the front, FIG. 11 illustrates a part of a curtain comprising a second embodiment of an irregular surface geometry, as seen from the front, FIG. 12 illustrates a part of a curtain comprising a third embodiment of an irregular surface geometry, as seen from the front, FIG. 13 illustrates a cross section through a vacuum lifting arrangement lifting six layers of items, as seen from the front.

DETAILED DESCRIPTION

Figure 6:
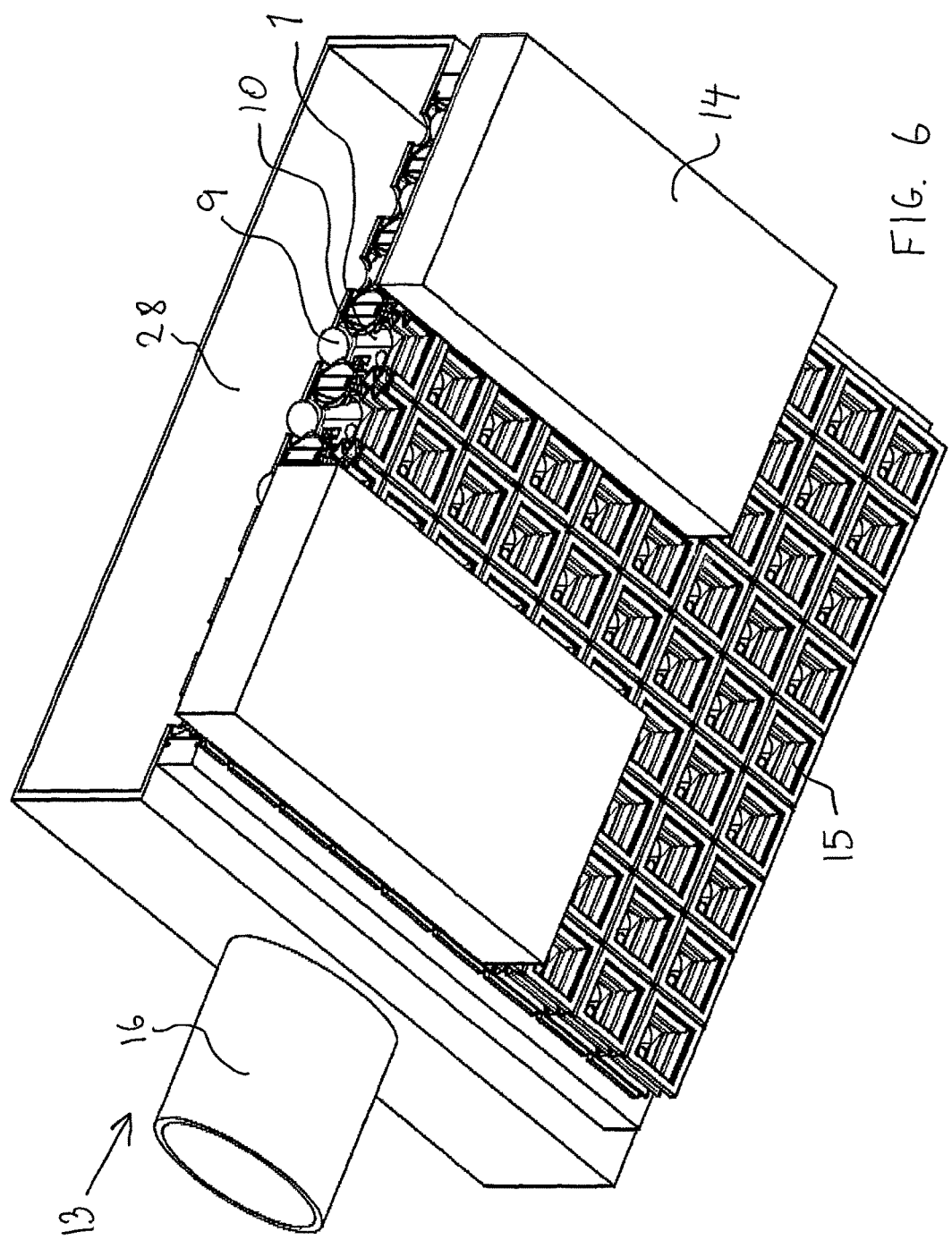
FIG. 6 illustrates a cross section through a vacuum lifting device lifting two items, as seen in perspective.

FIG. 1 illustrates a cross section through a flow blocking valve 1 connected to an engaged suction device 15 before vacuum is established, as seen from the side.

In this embodiment the flow blocking valve 1 is mounted directly onto a suction device 15 but in another embodiment the flow blocking valve 1 could be mounted separate from the device which flow it controls i.e. as a separate valve mounted on a hose or a pipe or it could be one of several valves mounted in a dedicated flow control cabinet.

In this embodiment the flow blocking valve 1 comprises a valve housing part 2 which in this embodiment constitutes substantially the entire valve house. However in another embodiment the valve housing part 2 would only constitute a part of the valve house. Further, the valve housing part 2 is hollow so that a flow duct 3 is formed between a flow inlet 4 and a flow outlet 6 arranged respectively at an inlet end 5 and an outlet end 7 of the flow duct 3.

A displaceable valve blocking device 9 is arranged inside said flow duct 3 so that it may move to and from a seat 8 arranged at the flow outlet 6 at the top of the valve housing part 2.

The displaceable valve blocking device 9 and the seat 8 is in this embodiment arranged so that when the valve blocking device 9 rests against the seat 8 the valve blocking device 9 will substantially block any flow out through the flow outlet 6 of the valve 1.

The valve could comprise dedicated means for forcing the valve blocking device 9 against the seat 8 to close the valve 1—such as spring means, a camshaft, an actuator—but in this embodiment the valve blocking device 9 is arranged so that it is lifted by the flow through the valve 1, up to the seat 8 where it is forced against the seat 8 due to the pressure difference across the flow outlet 6. Thus, as soon as the pressure outside the flow outlet 6 is the same or higher than the pressure inside the flow duct 3 the displaceable valve blocking device 9 will move away from the seat 8 and reopen the valve 1.

In this embodiment the displaceable valve blocking device 9 will completely block flow out through the flow outlet 6 when it is forced against the seat 8 but in another embodiment the displaceable valve blocking device 9, the seat 8 or both may be formed so that a small flow may still pass through the flow outlet 6 e.g. to ensure vacuum may be established in the connected suction device 15 even if the initial flow through the valve 1 should close the valve 1.

In this embodiment no flow has been established yet so the displaceable valve blocking device 9 rests against inlet protrusions 27 at the flow inlet 4 of the valve 1. The inlet protrusions 27 are in this embodiment arranged so that flow may pass the displaceable valve blocking device 9 even when it rests against inlet protrusions 27.

In this embodiment the displaceable valve blocking device 9 is formed as a single ball—i.e. a round spherical body—but in another embodiment the displaceable valve blocking device 9 could be formed differently such as oblong, cylindrical, conical, polygonal or any combination thereof or the valve blocking device 9 could comprise more than one individual body e.g. formed different from each other.

In this embodiment the suction device 15 is pressed lightly against an item 14 to be lifted but since vacuum has not yet been established inside the flow blocking valve 1, the suction device 15 is not yet attached to the item 14.

In this embodiment the suction device 15 is a suction cup but in another embodiment any of the suction devices 15 disclosed in this application could be a vacuum tube, a suction plate, a suction pad or any other kind of device suited for attaching to or at least attract another object by means of vacuum.

FIG. 2 illustrates a cross section through the flow blocking valve 1 and suction device 15 during a lifting process, as seen from the side.

In this embodiment the flow outlet 6 of the valve 1 is connected to a vacuum source (not shown) which is activated and therefore establishes a flow through the valve 1 and the suction device 15 as indicated by the arrows.

In this embodiment the flow blocking valve 1 is provided with obstruction means 10 in the form of a displaceable part 11 of the wall of the flow duct 3. In this embodiment the obstruction means 10 are activated so that they obstruct the passage of the displaceable valve blocking device 9 and thereby hinder it from reaching the seat 8 and thus block flow through the valve 1. The obstruction means 10 are formed so that they do not obstruct flow through the flow duct 3 no matter if they engage the displaceable valve blocking device 9. In this embodiment the valve is formed with a square cross section so that flow may pass the displaceable valve blocking device 9 even if the walls bend inwards to form obstruction means 10. However, in another embodiment constant free flow past the obstruction means 10 could be ensure trough dedicated channels, ducts or other suitable means.

In this embodiment the entire valve housing part 2 is formed by a flexible material so that the walls of the flow duct 3 may bend inwards to form the obstruction means 10.

However in another embodiment only a part of one or more the walls may be flexible and thus comprise the obstruction means 10.

The obstruction means 10 are arranged so that they move back and forth in a direction substantially transverse in relation to a longitudinal direction of the flow duct 3 and thus substantially transverse in relation to the direction of the flow through the duct 3 and the direction of the motion of the displaceable valve blocking device 9.

In this embodiment the flexible quality of the displaceable parts 11 of the walls is obtained by forming at least the displaceable parts 11 by a flexible rubber or rubber-like material such as any kind of natural or synthetic rubber, however in another embodiment the obstruction means 10 could comprise or be formed as more or less rigid hinged or bendable members.

In this embodiment the displaceable parts 11 of the wall of the flow duct 3 are provided with a protrusion 12 to ensure a stronger hold of the displaceable valve blocking device 9, however in another embodiment the displaceable parts 11 could be formed even and the displaceable parts 11 would then be held back by means of friction or simply because the obstruction means 10 reduces the width of the duct 3 to a degree that the displaceable valve blocking device 9 cannot pass the obstruction means 10.

FIG. 3 illustrates a cross section through a flow blocking valve 1 connected to a disengaged suction device 15 after vacuum is established, as seen from the side.

In this embodiment the displaceable valve blocking device 9 has travelled all the way up to the seat 8 before the obstruction means 10 have been activated. Thus, as long as the vacuum source is active the displaceable valve blocking device 9 will be sucked against the seat 8 and block the flow out of the flow outlet 6.

FIG. 4 illustrates a cross section through a vacuum lifting device 13 wherein the obstruction means 10 are pressure operated, as seen from the side.

In this embodiment vacuum lifting device 13 comprises a number of suction devices 15 arranged side by side in an array (as seen more clearly in FIG. 6), however in another embodiment the vacuum lifting device 13 could comprise only one row of suction devices 15 or the suction devices 15 could be arranged in another pattern.

Each of the suction devices 15 are in this embodiment connected directly to individual flow blocking valves 1 which in turn are connected to a common vacuum source 16 through a common distribution chamber 28. However in another embodiment each flow blocking valve 1 or some of the flow blocking valves 1 could be connected to more than one suction device 15. And in another embodiment the vacuum lifting device 13 could be provided with more than one vacuum source 16 so that at least not all the suction devices 15 was connected to the same vacuum source 16.

In this embodiment the vacuum lifting device 13 was first placed down onto the two items 14 where after the vacuum source 16 was activated. The vacuum will create at flow of air through the valves 1 which will lift the displaceable valve blocking device 9 of the inlet protrusions 27 and move them up towards the seat 8. But with the first three and the last three valves 1 the flow will very quickly stop in that the suction devices 15 are covered by the items 14 thereby hindering further flow through the suction devices 15 and the valves 1. This quick stop of the flow will ensure that the displaceable valve blocking device 9 of these six valves 1 will stay at the inlet protrusions 27 or at least return to the inlet protrusions 27 very quickly. However, the middle three suction devices 15 are not covered by an item 14 and here the flow through the valves 1 will continue until the displaceable valve blocking device 9 reach the seat 8 of the valve and thus blocking further flow through the valves 1.

Immediately thereafter the obstruction means 10 of all the valves 1 are activated to ensure that the displaceable valve blocking devices 9 stay on the present side of the obstruction means 10 throughout the entire lifting process or at least as long as desired. Thus, when the vacuum lifting device 13 starts lifting the items 14 and the wrapping of the item 14 to the right starts to deform, at least to some degree flow will be re-established in some of the valves 1 to the right but since the obstruction means 10 hinders the displaceable valve blocking devices 9 from reaching the seat 8 and since the obstruction means 10 still allows flow through the flow duct 3 of these valves 1, the suction devices 15 that are not completely sucked on to the item 14 will still aid in attaching the item 14 to the vacuum lifting device 13 and thus ensure that the item 14 is not dropped.

In this embodiment the vacuum lifting device 13 is provided with pressurizing means 17 including a common substantially closed chamber 18 established around the displaceable part 11 of the wall of all the flow blocking valves 1. In another embodiment the pressurizing means 17 could comprise more than one chamber 18 each enclosing one or more valves 1. The pressurizing means 17 also comprise one common pump means (not shown) connected to the chamber 18 but in another embodiment several individual or common pump means could be provided.

In this embodiment the initial, unstrained position of the displaceable part 11 of the wall of the valves 1 is substantially straight—as disclosed in FIG. 1—thus if the displaceable part 11 of the valves 1 is not forced actively inwards the displaceable valve blocking devices 9 will be able to pass the obstruction means 10.

Thus, in this embodiment the obstruction means 10 are activated by establishing a pressure higher than atmospheric pressure on the outside of the obstruction means 10. This is done by making the pump means pump air into the substantially closed chamber 18 preferably until a predefined pressure is reached. This pressure is in this embodiment around 0.3 Bar but it could be anywhere 0.05 to 10 Bar, preferably between 0.1 to 6 Bar and most preferred between 0.15 to 2 Bar above atmospheric pressure.

In another embodiment the displaceable part 11 of the wall of all the flow blocking valves 1 could be formed so flexible that simply the flow through the valves 1 is enough to create a vacuum inside the valves 1 that is big enough to activate the obstruction means 10. It might be more difficult to control the actual status of the obstruction means 10 in such an embodiment but given the fact the dedicated activation means can be avoided such an embodiment might be advantageous under certain conditions.

As explained above, in this embodiment the pressurizing means 17 activates the obstruction means 10 by creating a pressure difference between the inside and the outside of the displaceable part 11 of the wall of the flow blocking valves 1. However, if vacuum is established inside the valves 1 the pressurizing means 17 could e.g. simply establish atmospheric pressure on the outside of the displaceable part 11 of the wall of the valve 1 to make the displaceable part 11 move inwards and obstruct the path of the displaceable valve blocking devices 9. In such an embodiment the pump means of the pressurizing means 17 could be avoided.

In another embodiment the initial, unstrained position of the displaceable part 11 of the wall of the valves 1 could be bended inwards—as disclosed in FIGS. 2-4—thus if the displaceable part 11 of the valves 1 is not forced actively outwards the displaceable valve blocking devices 9 will not be able to pass the obstruction means 10.

In such an embodiment the obstruction means 10 could be activated—in this case moved outwards to allow passage of the displaceable valve blocking devices 9—by establishing a pressure on the outside of the valves 1 that is lower than the pressure on the inside of the valves 1—i.e. substantially the opposite situation of the described in the above mutatis mutandis. This embodiment is advantageous in that the pressurizing means 17 could be avoided and that the obstruction means 10 could be activated by a vacuum source which could be readily available.

FIG. 5 illustrates a cross section through a vacuum lifting device 13 wherein the obstruction means 10 are mechanically operated, as seen from the side.

The obstruction means 10 can also be activated in other ways than by means of pressure. In this embodiment a common frame 29 is established around all the valves 1. The frame 29 is arranges so that when it is displaced horizontally—e.g. manually or by means of an actuator—it will press against the displaceable part 11 of the valves 1 so that the displaceable valve blocking devices 9 will not be able to pass the obstruction means 10.

In another embodiment the vacuum lifting device 13 would be provided more than one frame 29 and/or the frame(s) 29 would only be arranged to activate some of the valves 1.

In another embodiment other mechanical means could be provided to activate some or all of the obstruction means 10 such as wires, strings or chains being activated manually or automatically or dedicated actuators.

FIG. 6 illustrates a cross section through a vacuum lifting device 13 lifting two items 14, as seen in perspective.

In this embodiment less than half of the suction devices 15 are covered by the items 14. Thus if flow through the "free" suction devices 15 is not blocked by the flow blocking valves 1 it would be very difficult to establish enough vacuum in the covered suction devices 15 to be able to lift the items 14.

Figure 7:
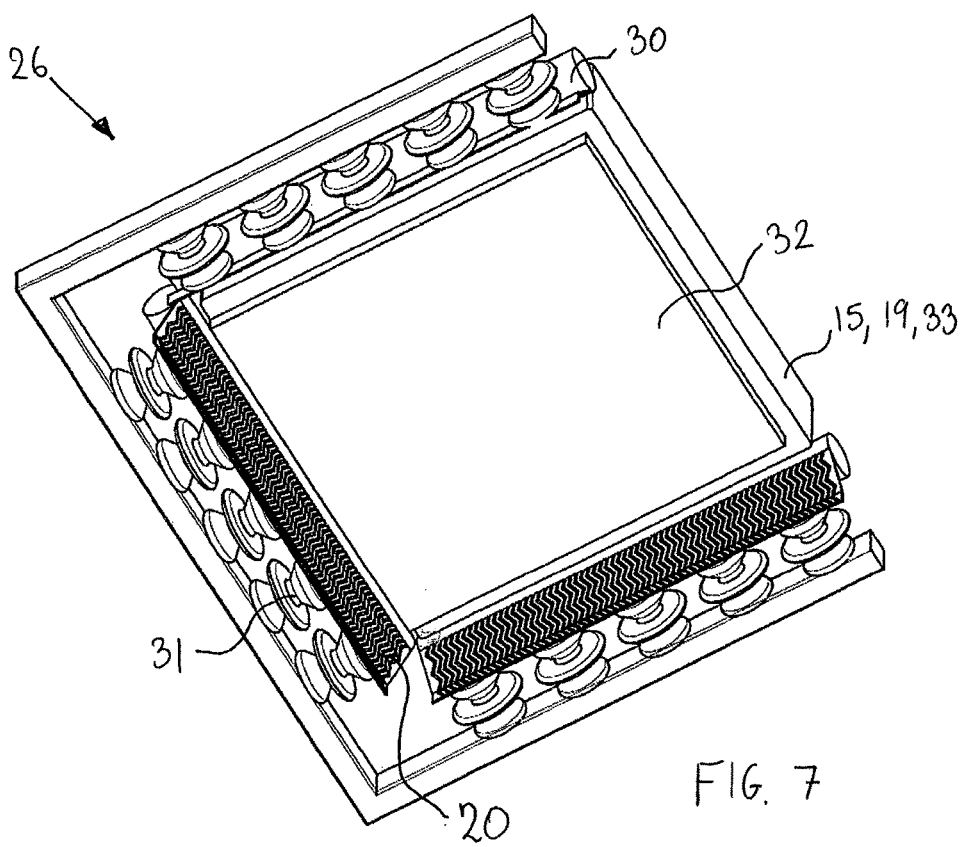
FIG. 7 illustrates a cross section through a vacuum lifting arrangement with curtains in initial position, as seen in perspective.

FIG. 7 illustrates a cross section through a vacuum lifting arrangement 26 with curtains 20 in initial position, as seen in perspective.

In this embodiment a cross section is made through the right side of the vacuum lifting arrangement 26 but if the cross section was not made the drawing would show that all four sides of the vacuum lifting arrangement 26 would look substantially identical.

In this embodiment the vacuum lifting arrangement 26 is formed substantially square but in another embodiment the vacuum lifting arrangement 26 could be formed rectangular, round, oval, polygonal or it could be provided with any other shape e.g. defined by the specific use.

Figure 8:
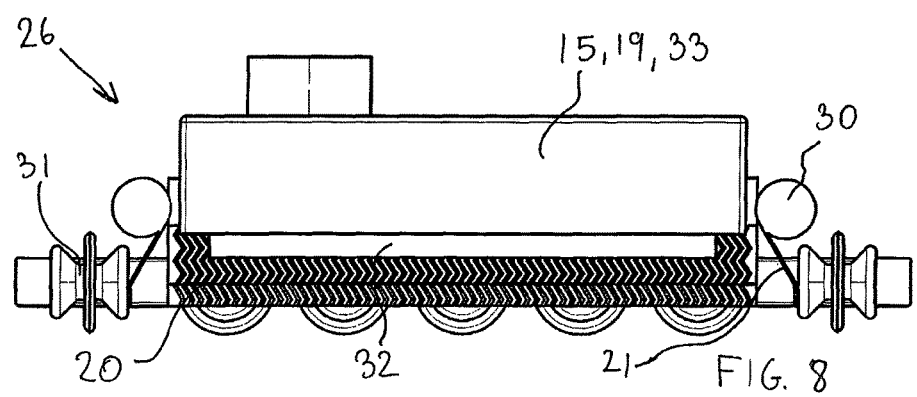
FIG. 8 illustrates the vacuum lifting arrangement shown in FIG. 7, as seen from the front.

FIG. 8 illustrates the vacuum lifting arrangement 26 shown in FIG. 7, as seen from the front.

In this embodiment the vacuum lifting arrangement 26 comprise a top frame 19 including a suction device 15 which in this case comprise a large suction chamber 33 formed in the top frame 19. In this embodiment the top frame 19 further comprise a back-stop 32 against which the items 14 are held/forced during a lifting process as disclosed in FIG. 13.

In this embodiment the suction device 15 is connected to a vacuum source (not shown) which in this case is a vacuum blower.

At the sides the top frame 19 is provided with curtains 20 which in this embodiment are primarily rolled up into curtains rolls 30.

The curtains 20 extend downwards from the top frame 19 down to displacement means 31—to which they are attached—so that when the displacement means 31 moves up and down the curtains 20 are rolled off and on the curtains rolls 30.

However, in another embodiment the vacuum lifting arrangement 26 would not comprise curtains rolls 30 and the curtains 20 could instead be folded in top position, hang freely down the outside of the displacement means 31 or the actual position of the curtains 20 could be controlled in another suitable way.

FIG. 9 illustrates a cross section through a vacuum lifting arrangement 26 with curtains 20 rolled down, as seen from the front.

Figure 14:
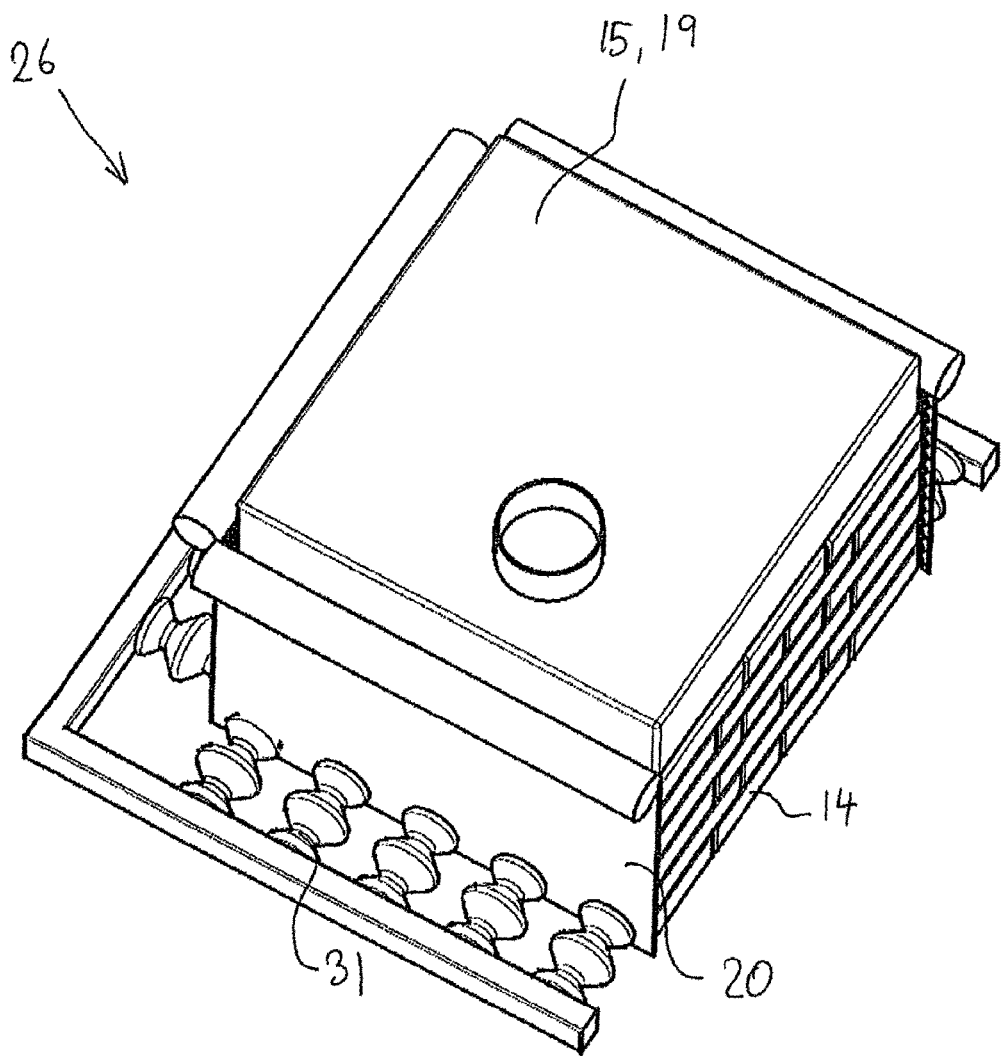
FIG. 14 illustrates the vacuum lifting arrangement shown in FIG. 13, as seen in perspective.

In this embodiment the curtains 20 are in bottom position and the displacement means 31 have been activated to press and maintain a bottom part of the curtains 20 against the sides of the items 14 to be lifted (See FIGS. 13-14).

In this embodiment the displacement means 31 are formed as a number of pneumatically operated bellows but in another embodiment the displacement means 31 could instead be electrically, hydraulically or manually operated and/or the displacement means 31 could be formed as an inflatable hose, as a mechanical construction and/or the displacement means 31 could comprise actuators, motors or other suitable means.

In this embodiment the vacuum lifting arrangement 26 is of a size that it is suited for de-palletizing layers of boxes 14 from a standard Euro pallet but in another embodiment the present invention could be used for lifting and moving any kind of objects 14, particularly stacked objects 14 where several layer should be moved at the same time, layers of objects 14 that includes air gabs in or between the objects 14 which makes it difficult or impossible to use ordinary suction devices 15, single or layers of fragile objects 14 that could not stand to be lifted at the top surface, single or layers of awkward shaped objects 14 which do not comprise a uniform top surface, single or layer of porous objects, any combination of the above or any other type of object 14 or objects 14 which are not suited for being lifted by standard vacuum lifters designed to attach only to the top surface of the object 14 or objects 14 to be moved.

In normal use of the vacuum lifting arrangement 26 with the curtains 20 in top position (as disclosed in FIGS. 7-8) will be moved down on top of the items 14 to be moved— preferably so that the back-stop 32 rests against the top layer of the items 14. Once in position—or during the travel to said position (e.g. to save time)—the curtains 20 are rolled down the sides of the desired number of layers of items 14 to be lifted. Then the displacement means 31 are activated to move the bottom part of the curtains 20 inwards to press the curtains 20 against the bottom layer to be lifted. Vacuum is now established in the suction device 15 hereby sucking the curtains 20 in against the sides of the items 14 where after the items 14 are lifted and moved to a new location. Once the desired location is reached the vacuum is turned off, the displacement means 31 are retracted and the curtains are rolled up before the vacuum lifting arrangement 26 is moved back in a position to grab and displaced the next layers of items 14.

In this embodiment the vacuum lifting arrangement 26 would be mounted at the end of a free-arm robot but in another embodiment the vacuum lifting arrangement 26 could form part of a machine—such as a (de-)palletizer, a gantry-type robot, a packing machine or similar—or the vacuum lifting arrangement 26 could be manually displaced.

In an embodiment the displacement means 31 do not move up and down but are permanently arranged in the bottom position disclosed in FIG. 9. Thus in such an embodiment the curtain rolls 30 or other means controlling the position of the curtains when the displacement means 31 is in top position could be avoided.

To ensure that the vacuum is efficiently distributed along the entire side surface of the items 14 to be lifted, the inside surface of the curtains 20 are in this embodiment provided with an irregular surface geometry forming channels, grooves and furrows in the inside surface of the curtains 20 to allow fluid communication between the suction device 15 and the bottom of the curtains 20 even if the curtains 20 are held/sucked firmly against the sides of the items 14 to be lifted.

In this embodiment the curtains 20 are formed from a flexible natural rubber material allowing that the curtains 20 may cling firmly around the items 14 to be lifted and thus ensuring a strong hold on the items 14 during the lifting and moving process. However, in another embodiment the curtains 20 or parts of the curtains 20 could be formed by synthetic rubber, by plastic or any other suitable flexible material.

FIG. 10-12 illustrates three different embodiments of curtains 20 comprising irregular surface geometries, as seen from the front.

In FIG. 10-12 the irregular surface geometry extends from a top part 25 of the curtains 20 and substantially down to the displacement means 31 at the bottom of the curtains 20. In FIG. 10 the irregular surface geometry is formed as straight channels in the inside surface of the curtains 20, in FIG. 11 the irregular surface geometry is formed as a granulated surface geometry comprising a number of distributed protrusions and in FIG. 12 the irregular surface geometry is formed a zigzag shaped channels.

However in another embodiment the irregular surface geometry could be formed in a number of other ways or a combination of these e.g. dependent on the specific use.

In the embodiment the channel walls and the protrusions of the granulated surface extends approximately 1.5 mm from the base surface of the irregular surface geometry of the curtains 20 but this height could obviously be different e.g. adapted to a specific surface geometry of the items 14 to be lifted, to the flexibility of the curtain material or other.

In this embodiment the surface protrusions of the irregular surface geometry covers approximately half the surface comprising the irregular surface geometry, thus allowing the vacuum to be distributed through the channels being formed in the remaining half of the surface. However, e.g. dependent on the specific surface geometry of the items 14 to be lifted, the flexibility of the curtain material or other the surface protrusions could cover more or less of the irregular surface geometry.

In this embodiment the irregular surface geometry is substantially evenly distributed over the entire inside surface of the curtains 20 but in another embodiment only parts of the inside surface of the curtains 20 would comprise the irregular surface geometry.

FIG. 13 illustrates a cross section through a vacuum lifting arrangement 26 lifting six layers of items 14, as seen from the front.

In this embodiment air gabs are formed between the items 14 both vertically and horizontally ensuring that the vacuum established in the suction device 15 is distributed all the way down through the layers.

The irregular surface geometry in the inside surface of the curtains 20 also ensures that vacuum is established all the way down the sides of the items 14 thus ensuring a strong hold of all the items 14 during a lifting process.

FIG. 14 illustrates the vacuum lifting arrangement 26 shown in FIG. 13, as seen in perspective.

The invention has been exemplified above with reference to specific examples of flow blocking valves 1, obstruction means 10, vacuum lifting device 13, vacuum lifting arrangement 26 and other. However, it should be understood that the invention is not limited to the particular examples described above but may be designed and altered in a multitude of varieties within the scope of the invention as specified in the claims.

The invention claimed is:

1. A vacuum lifting device for fixating goods by means of vacuum, wherein said vacuum lifting device comprises one or more suction devices connected to a vacuum source through flow blocking valves, each flow blocking valve comprising:
   a valve housing part forming a flow duct between a flow inlet arranged at an inlet end of said duct and a flow outlet arranged at an outlet end of said duct, wherein a seat is arranged at said flow outlet,
   a displaceable valve blocking device arranged to move inside said flow duct, wherein said blocking device is arranged to block the flow through said valve when being forced against said seat, and
   obstruction means being displaceable in a direction substantially transverse in relation to a longitudinal direction of said flow duct, wherein said obstruction means is arranged to controllably obstruct the passage of said displaceable valve blocking device without completely disabling flow through said flow duct; and
   wherein said vacuum lifting device further comprises pressurising means for creating a pressure difference between the inside and the outside of at least a part of said obstruction means.

2. A vacuum lifting device according to claim 1, wherein said obstruction means is formed by a displaceable part of a wall of said duct.

3. A vacuum lifting device according to claim 1, wherein said displaceable part of said wall of said duct is formed at a middle part of said flow duct.

4. A vacuum lifting device according to claim 1, wherein said displaceable part of said wall of said duct comprises a protrusion.

5. A vacuum lifting device according to claim 1, wherein at least said displaceable part of said wall of said duct is formed by a flexible rubber or rubber-like material.

6. A vacuum lifting device according to claim 1, wherein said force forcing said displaceable valve blocking device against said seat is a pressure difference across said displaceable valve blocking device.

7. A vacuum lifting device according to claim 1, wherein said pressurising means is configured for establishing a pressure higher than atmospheric pressure at at least a part of the outside of said obstruction means of said flow blocking valves.

8. A vacuum lifting device according to claim 1, wherein said pressurising means comprises a substantially closed chamber formed at least around a part of obstruction means of said flow blocking valves.

9. A vacuum lifting device according to claim 1, wherein said pressurising means comprises a common pressure source.

10. A vacuum lifting device according to claim 1, wherein said one or more suction devices are one or more suction cups.

11. A method for operating a vacuum lifting device according to claim 1, said method comprising the steps of:
   placing said at least one suction device of said vacuum lifting device against an item to be moved,
   activating said vacuum source,
   activating obstruction means of said flow blocking valve after said vacuum source has been activated.

12. A method according to claim 11, wherein said obstruction means is activated by establishing a pressure higher than atmospheric pressure outside said obstruction means.

13. A method according to claim 11, wherein said obstruction means is activated between 1 and 5000 milliseconds after said vacuum source is activated.

* * * * *